(12) United States Patent
Ott

(10) Patent No.: US 6,742,105 B1
(45) Date of Patent: May 25, 2004

(54) METHOD AND SYSTEM FOR RANGE MATCHING

(75) Inventor: Michael L. Ott, Pleasanton, CA (US)

(73) Assignee: Silicon Access Networks, San Jose, CA (US)

(\*) Notice: Subject to any disclaimer, the term of this patent is extended or adjusted under 35 U.S.C. 154(b) by 223 days.

(21) Appl. No.: 09/748,052

(22) Filed: Dec. 22, 2000

(51) Int. Cl.[7] .............................................. G06F 12/00
(52) U.S. Cl. .......................... 711/220; 711/5; 711/173; 711/216
(58) Field of Search ............................ 711/1, 3, 5, 220, 711/202, 206, 207, 170, 173, 128, 147, 153, 148, 216

(56) References Cited

U.S. PATENT DOCUMENTS

| | | | | |
|---|---|---|---|---|
| RE31,318 E | \* | 7/1983 | Kaufman et al. ............ | 711/201 |
| 5,303,359 A | \* | 4/1994 | Suzuki ........................ | 711/207 |
| 5,418,956 A | \* | 5/1995 | Willman ...................... | 711/206 |
| 5,564,030 A | \* | 10/1996 | Whitted et al. .............. | 711/201 |
| 5,577,219 A | \* | 11/1996 | Timko et al. ................ | 711/201 |
| 5,659,699 A | \* | 8/1997 | Breternitz, Jr. .............. | 711/216 |
| 5,809,562 A | \* | 9/1998 | Gaskins et al. .............. | 711/207 |
| 5,850,632 A | \* | 12/1998 | Robertson ..................... | 711/170 |
| 6,092,151 A | \* | 7/2000 | Park ............................. | 711/118 |
| 6,260,101 B1 | \* | 7/2001 | Hansen et al. .................. | 711/5 |
| 6,260,121 B1 | \* | 7/2001 | Jeddeloh ....................... | 711/154 |
| 6,272,612 B1 | \* | 8/2001 | Bordaz et al. .............. | 711/203 |
| 6,275,894 B1 | \* | 8/2001 | Kuo et al. ................... | 711/103 |
| 6,470,414 B2 | \* | 10/2002 | Kuo et al. ................... | 711/103 |
| 6,510,507 B1 | \* | 1/2003 | Matt et al. ................... | 711/206 |

\* cited by examiner

Primary Examiner—Donald Sparks
Assistant Examiner—Brian R. Peugh
(74) Attorney, Agent, or Firm—Fernandez & Associates, LLP

(57) ABSTRACT

A range match circuit is disclosed for fast compare of an incoming address by partitioning the incoming address into fields. In one embodiment, a 16-bit incoming address is divided into quarterly fields, or four segments of 4-bit addresses, for comparison with a 16-bit top end boundary that has been divided into quarterly fields and a 16-bit bottom end boundary that has been divided into quarterly fields. Consequently, the range match circuit is able to analyze the entire 16-bit address field in parallel and perform simple combinational logic to determine if the incoming address is within the boundaries described by the top edge and bottom edge of the range.

24 Claims, 6 Drawing Sheets

METHOD AND SYSTEM FOR RANGE MATCHING

BACKGROUND INFORMATION

1. Field of the Invention

The present invention relates generally to the field of computing systems, and more particularly to range matching of addresses.

2. Description of Related Art

Networking companies are scrambling in a race to design and develop high performance network processing products for the terabit router market while reducing the cost to implement 10 giga-bits per second/OC192 and above optical carrier network interfaces. Terabit routers demand a higher throughput of data packets for examining an incoming packet, retrieves a next hop location, and transfers the packet to destination. To produce a faster response time in matching an incoming address, a technique called range matching has been used. For background information on range matching, the reader is referred to multirange and multidimensional range matching algorithm as presented in: "HighSpeed Policy-Based Packet Forwarding Using Efficient Multi-Dimensional Range Matching", Lakshman & Stiliadis, Bell Labs, 1998.

Accordingly, it is desirable to have a method and system for fast matching of an incoming address with addresses in a memory.

SUMMARY OF THE INVENTION

The invention provides a range matching circuit that determines if a field value is within the specified range of values, described as a top end boundary ("top edge") and a bottom end boundary ("bottom edge"). This analysis is done by partitioning the incoming address into fields. In one embodiment, a 16-bit incoming address is divided into quarterly fields, or four segments of 4-bit addresses, for comparison with four 4-bit segments of the 16-bit top edge and the four 4-bit segments of the 16-bit bottom edge. Each 4-bit segment can be analyzed independently in parallel in which a combined result is generated at the output.

DETAILED DESCRIPTION OF PREFERRED EMBODIMENTS

Figure 1:
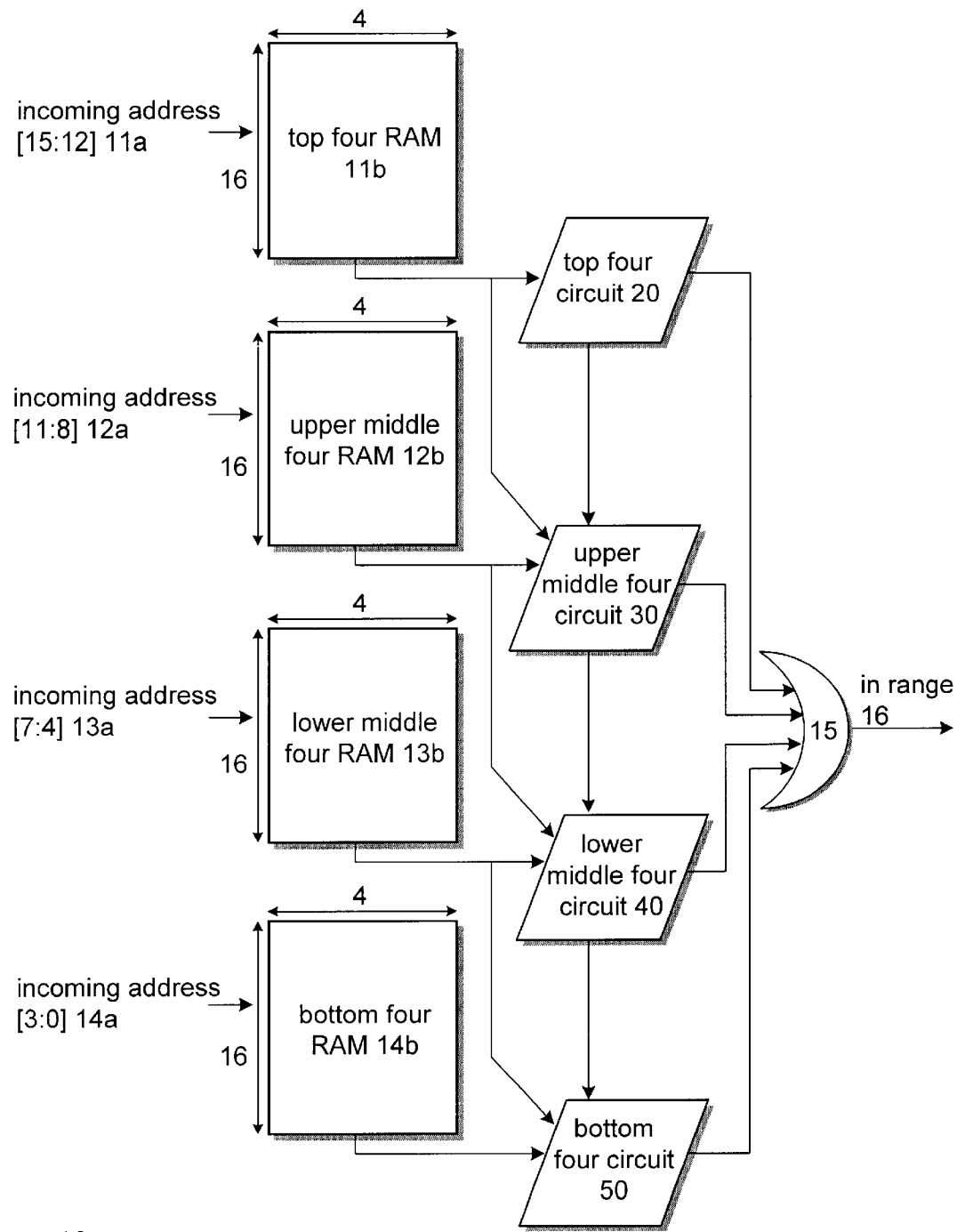
FIG. 1 is an architectural diagram illustrating one embodiment of a range matching circuit in accordance with the present invention.

FIG. 1 is an architectural diagram illustrating one embodiment of a range matching circuit 10. In this embodiment, the range matching circuit 10 uses a field quartering technique to analyze range matching in a 16-bit address space. A single 16-bit address may fall within multiple ranges. The ranges themselves are described by a top edge (TE[15:0]) and a bottom edge (BE[15:0]). Each TE[15:0] is divided into four segments: TE[15:12]; TE[11:8], TE[7:4], and TE[3:0], and each BE[15:0] is also divided into four segments: BE[15:12], BE[11:8], BE[7:4], and BE[3:0].

Each pair of four bits TE[15:12] & BE[15:12]; TE[11:8] & BE[11:8], TE[7:4]BE[7:4]; TE[3:0] & BE[3:0] are encoded into four RAMs, one for each pair of four edge bits. These RAMs are—16 rows in height and 4 columns (4-bits) wide. The encoding of the RAMs is as follows:

Column1: This column is all zeros, except for the one row that matches the 4-bit value of the TE segment. (TE column—"top edge" column)

Column2: This column is all zeros, except for the one row that matches the 4-bit value of the BE segment. (BE column—"bottom edge" column)

Column3: This column is all zero for the rows that are equal or greater than the 4-bit value of the TE segment. All rows that are less than the 4-bit TE segment are one. (TEI column—"inside top edge" column)

Column4: This column is all zero for the rows that are equal or less than the 4-bit value of the BE segment. All rows that are greater than the 4-bit TE segment are one. (BEI column—"inside bottom edge" column)

To illustrate these columns, the RAM has the encodings for TE segment=1010 and BE segment=0100, as shown below in Table 1.

TABLE 1

| Address | Address = TE | Address = BE | Address < TE | Address > BE |
|---|---|---|---|---|
| 1111 | 0 | 0 | 0 | 1 |
| 1110 | 0 | 0 | 0 | 1 |
| 1101 | 0 | 0 | 0 | 1 |
| 1100 | 0 | 0 | 0 | 1 |
| 1011 | 0 | 0 | 0 | 1 |
| 1010 (TE value) | 1 | 0 | 0 | 1 |
| 1001 | 0 | 0 | 1 | 1 |
| 1000 | 0 | 0 | 1 | 1 |
| 0111 | 0 | 0 | 1 | 1 |
| 0110 | 0 | 0 | 1 | 1 |
| 0101 | 0 | 0 | 1 | 1 |
| 0100 (BE value) | 0 | 1 | 1 | 0 |
| 0011 | 0 | 0 | 1 | 0 |
| 0010 | 0 | 0 | 1 | 0 |
| 0001 | 0 | 0 | 1 | 0 |
| 0000 | 0 | 0 | 1 | 0 |

Initially, a 16-bit incoming address is divided into four 4-bit segments, the incoming address [15:12] 11a, the incoming address [11:8] 12a, the incoming address [7:4] 13a, and the incoming address [3:0] 14a. When comparing a four-bit address segment to the corresponding 4-bit top and bottom edge segments, the number of possible outcomes that need to be determined is limited: address=TE, address=BE, address<TE, or address>BE.

The top four RAM 11b receives the incoming address [15:12] 11a and the four output (address=TE, address=BE, address<TE, or address>BE) is the top four circuit 20, and an upper middle four circuit 30.

The upper middle four RAM 12b receives the incoming address [11:8] 12a and the four bits of RAM output (address=TE, address=BE, address<TE, or address>BE) is forwarded to upper middle four circuit 30, and a lower middle four circuit 40.

A lower middle four RAM 13b receives the incoming address [7:4] 13a and the four bits of RAM output (address=TE, address=BE, address<TE, or address>BE) is forwarded to the lower middle four circuit 40, and a bottom four circuit 50.

A bottom four RAM 14b receives the incoming address [3:0] 14a and the four bits of RAM output (address=TE, address=BE, address<TE, or address>BE) is forwarded to the bottom four circuit 50.

It is apparent to one of ordinary skill in the art that the top four RAM 11b, the upper middle four RAM 12b, the lower middle four RAM 13b, and the bottom four RAM 14b, can be referred to in other similar terms, such as memory segments, or a sub-memories.

An OR gate 15 receives inputs from the top four circuit 20, the upper middle four circuit 30, the lower middle four circuit 40, and the bottom four circuit 50, to generate an in-range signal 16.

Figure 2:
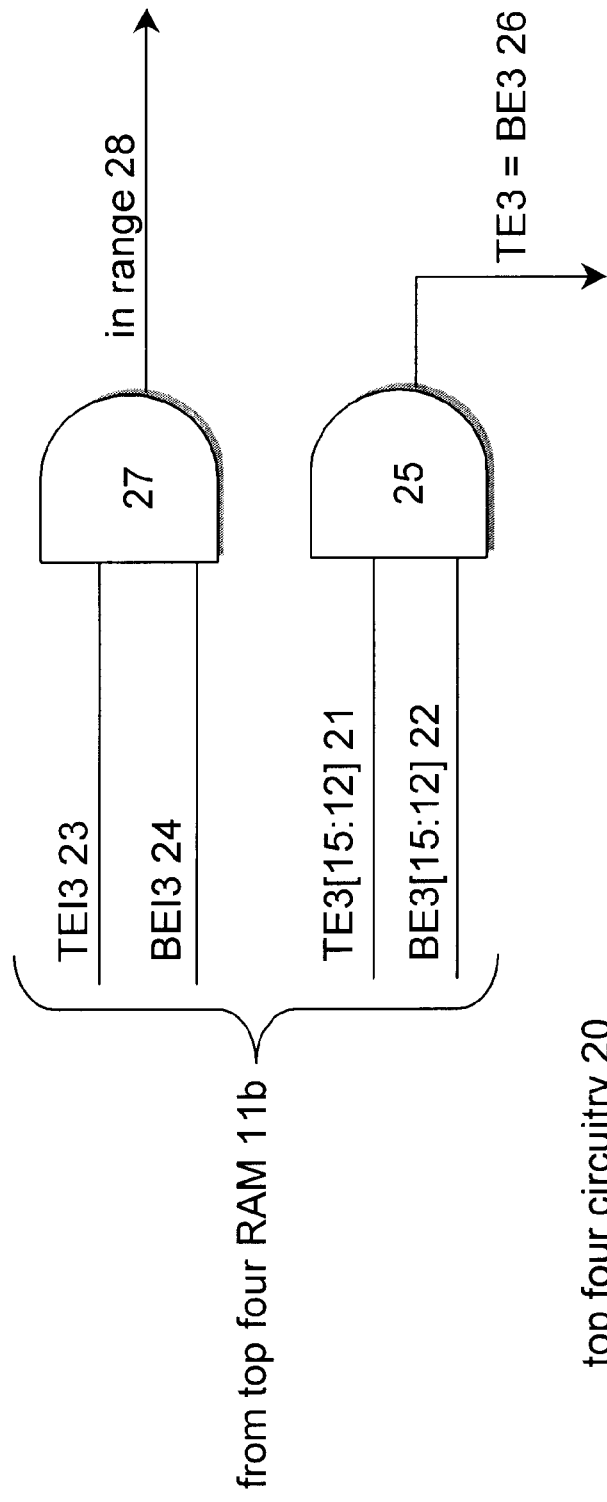
FIG. 2 is a gate-level diagram illustrating a top four-bit circuitry in the range matching circuit in accordance with the present invention.

FIG. 2 is a gate-level diagram illustrating the top four-bit circuitry 20 in the range matching circuit 10. During the comparison of address bits, IA[15:12] to the edge bits TE[15:12] and BE[15:12], through the top four bit circuitry 20, there are five possible situations that can result:

first, the incoming address matches the top edge address, IA[15:12]=TE3[15:12] but not the bottom edge address, IA[15:12]≠BE[15:12];

second, the incoming address matches the bottom edge address, IA[15:12]=BE3[15:12] but not the top edge address, IA[15:12]≠TE[15:12];

third, the incoming address matches both the top edge address TE[15:12] and the bottom edge address, IA[15:12]=BE3[15:12];

fourth, the incoming address is less than the top end address, IA[15:12]<TE[15:12] and is also greater than the bottom end address, IA[15:12]>BE3[15:12];

fifth, none of the above.

In the first situation where IA[15:12] 11a=TE3[15:12] 21, and IA[15:12]≠BE[15:12], the range matching circuit 10 continues to compare the subsequent twelve bits IA[11:0] of the incoming address. If the twelve lower address bits of the incoming address are less than or equal to the twelve lower top edge bits, IA[11:0]≦TE[11:0], then the incoming address may be within range.

In the second situation where IA[15:12] 11a=BE3[15:12] 22, and IA[15:12]≠TE[15:12] the range matching circuit 10 continues to compare the subsequent twelve bits IA[11:0] of the incoming address. If the twelve lower address bits of the incoming address are greater than or equal to the twelve lower bottom edge, IA[11:0]≧BE[11:0], then the incoming address may be within range.

In the third situation where IA[15:12]=TE[15:12]=BE[15:12], the range matching circuit 10 continues to compare the subsequent twelve bits IA[11:0] of the incoming address. If the twelve lower address bits of the incoming address are greater than or equal to the twelve lower bottom edge, IA[11:0]≧BE[11:0], and less than or equal to the twelve lower top edge, IA[11:0]≦TE[11:0] then the incoming address is within range.

In the fourth situation where IA[15:12]<TE[15:12] and IA[15:12]>BE3[15:12], the range matching circuit does not need to compare the lower twelve bits, since the incoming address is within range.

In the fifth situation, where none of the above is true, the range matching circuit does not need to compare the lower twelve bits, since the incoming address is not within range.

Figure 3:
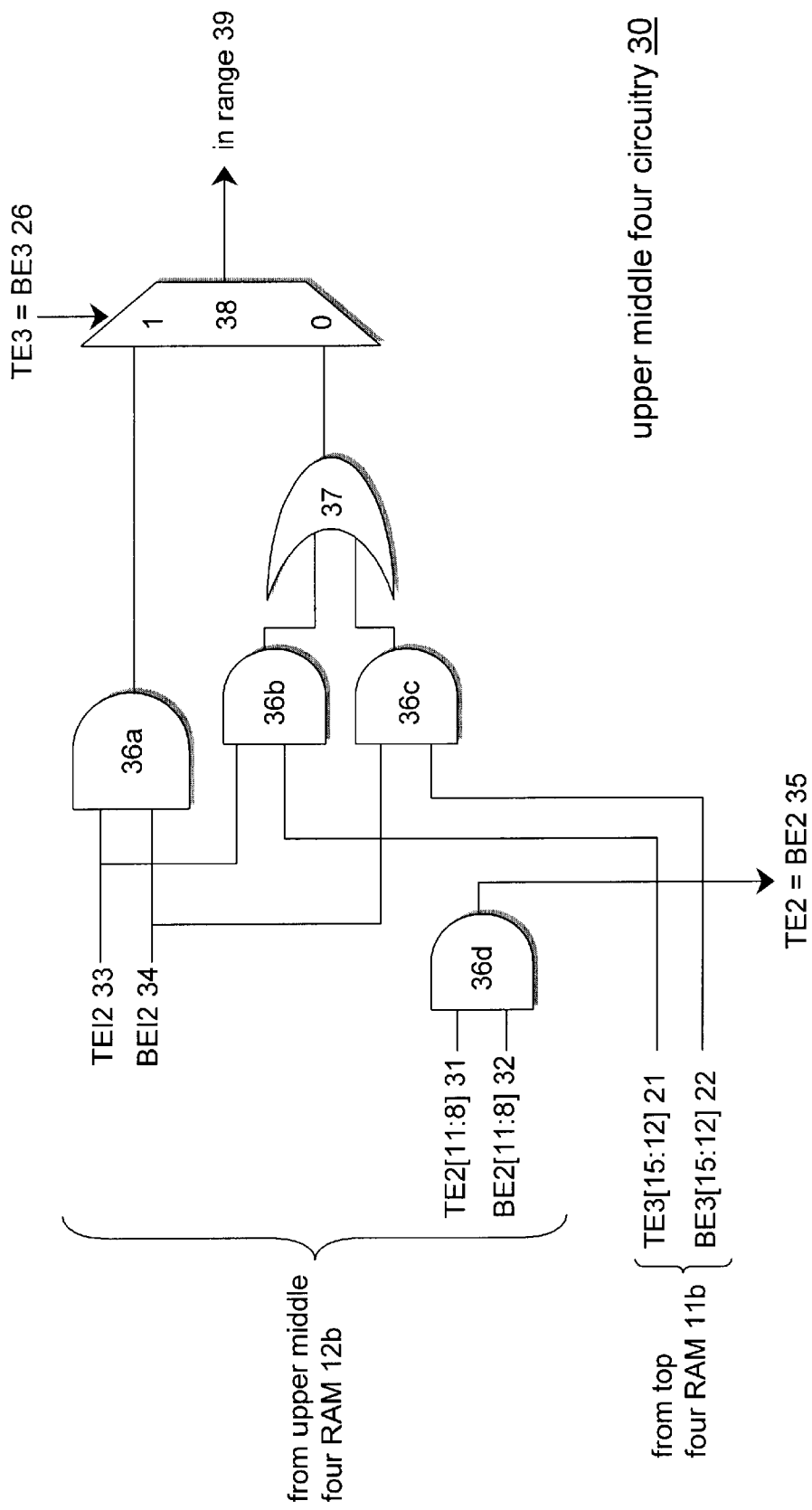
FIG. 3 is a gate-level diagram illustrating an upper middle four-bit circuitry in the range matching circuit in accordance with the present invention.

FIG. 3 is a gate-level diagram illustrating an upper middle four-bit circuitry 30 in the range matching circuit 10. During the comparison of address bits, IA[11:8] to the edge bits TE[11:8] and BE[11:8], through the upper middle four bit circuitry 20, there are seven possible situations that can result:

first, the incoming address matches the top edge address, IA[11:8]=TE3[11:8] but not the bottom edge address, IA[11:8]≠BE[11:8];

second, the incoming address matches the bottom edge address, IA[11:8]=BE3[11:8] but not the top edge address, IA[11:8]≠TE[11:8];

third, the incoming address matches both the top edge address TE[11:8] and the bottom edge address, IA[11:8]=BE3[11:8];

fourth, the incoming address is less than the top edge address, IA[11:8]<TE[11:8];

fifth, the incoming address is greater than the bottom edge address, IA[11:8]<TE[11:8]

sixth, the incoming address is less than the top edge address, IA[11:8]<TE[11:8] and is also greater than the bottom edge address, IA[11:8]>BE3[11:8];

seventh, none of the above.

These situations are combined with information from the top four-bit circuitry to create seven scenarios:

First, if IA[15:12]=TE[15:12] but not =BE[15:12], then the incoming address will be within range if IA[11:8]<TE[11:8].

Second, if IA[15:12]=TE[15:12], then the incoming address may be within range if IA[11:8]=TE[11:8]. In this case the bottom eight bits of the incoming address and the bottom eight bits of the top edge would need to be analyzed. This is described later.

Third, if IA[15:12]=BE[15:12] but not =TE[15:12], then the incoming address will be within range if IA[11:8]>BE[11:8].

Fourth, if IA[15:12]=TE[15:12], then the incoming address may be within range if IA[11:8]=BE[11:8]. In this case the bottom eight bits of the incoming address and the bottom eight bits of the bottom edge would need to be analyzed. This is described later.

Fifth, if IA[15:12]=TE[15:12] and is also =BE[15:12], then the incoming address is within range if TE[11:8]>IA[11:8]>BE[11:8].

Sixth if IA[15:12]=TE[15:12] and =BE[15:12], then the incoming address may be within range if IA[11:8]=TE[11:8] and BE[11:8]. In this case the bottom eight bits of the incoming address and the bottom eight bits of the top edge and the bottom eight bits of the bottom edge would need to be analyzed. This is described later.

Seventh, if none of the above six scenarios are true, then the incoming address is outside the range.

Figure 4:
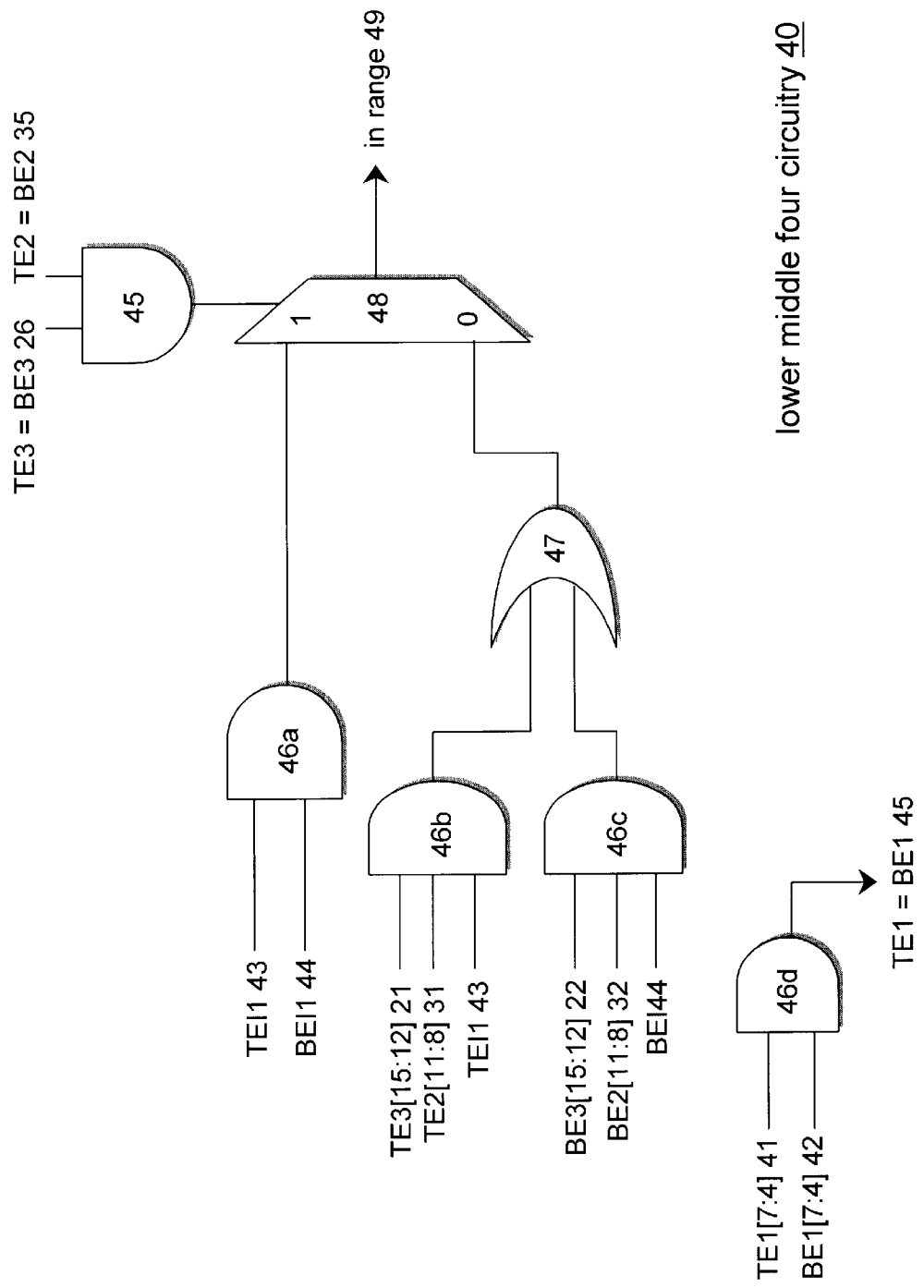
FIG. 4 is a gate-level diagram illustrating a lower middle four-bit circuitry in the range matching circuit in accordance with the present invention.

FIG. 4 is a gate-level diagram illustrating the lower middle four-bit circuitry 40 in the range matching circuit 10. During the comparison of address bits, IA[7:4] to the edge bits TE[7:4] and BE[7:4], through the lower middle four bit circuitry 20, there are seven possible situations that can result:

first, the incoming address matches the top edge address, IA[7:4]=TE3[7:4] but not the bottom edge address, IA[7:4]≠BE[7:4];

second, the incoming address matches the bottom edge address, IA[7:4]=BE3[7:4] but not the top edge address, IA[7:4]≠TE[7:4];

third, the incoming address matches both the top edge address TE[7:4] and the bottom edge address, IA[7:4]=BE3[7:4];

fourth, the incoming address is less than the top edge address, IA[7:4]<TE[7:4];

fifth, the incoming address is greater than the bottom edge address, IA[7:4]<TE[7:4]

sixth, the incoming address is less than the top edge address, IA[7:4]<TE[7:4] and is also greater than the bottom edge address, IA[7:4]>BE3[7:4];

seventh, none of the above.

These situations are combined with information from the top four-bit circuitry and the upper middle four-bit circuitry to create seven scenarios:

First, if IA[15:8]=TE[15:8] but not =BE[15:8], then the incoming address will be within range if IA[7:4]<TE[7:4].

Second, if IA[15:8]=TE[15:8], then the incoming address may be within range if IA[7:4]=TE[7:4]. In this case the bottom four bits of the incoming address and the bottom four bits of the top edge would need to be analyzed. This is described later.

Third, if IA[15:8]=BE[15:8] but not =TE[15:8], then the incoming address will be within range if IA[7:4]>BE[7:4].

Fourth, if IA[15:8]=TE[15:8], then the incoming address may be within range if IA[7:4]=BE[7:4]. In this case the bottom four bits of the incoming address and the bottom four bits of the bottom edge would need to be analyzed. This is described later.

Fifth, if IA[15:8]=TE[15:8] and is also =BE[15:8], then the incoming address is within range if TE[7:4]>IA[7:4] >BE[7:4].

Sixth, if IA[15:8]=TE[15:8] and =BE[15:8], then the incoming address may be within range if IA[7:4]=TE[7:4] and BE[7:4]. In this case the bottom four bits of the incoming address and the bottom four bits of the top edge and the bottom four bits of the bottom edge would need to be analyzed. This is described later.

Seventh, if none of the above six scenarios are true, then the incoming address is outside the range.

Figure 5:
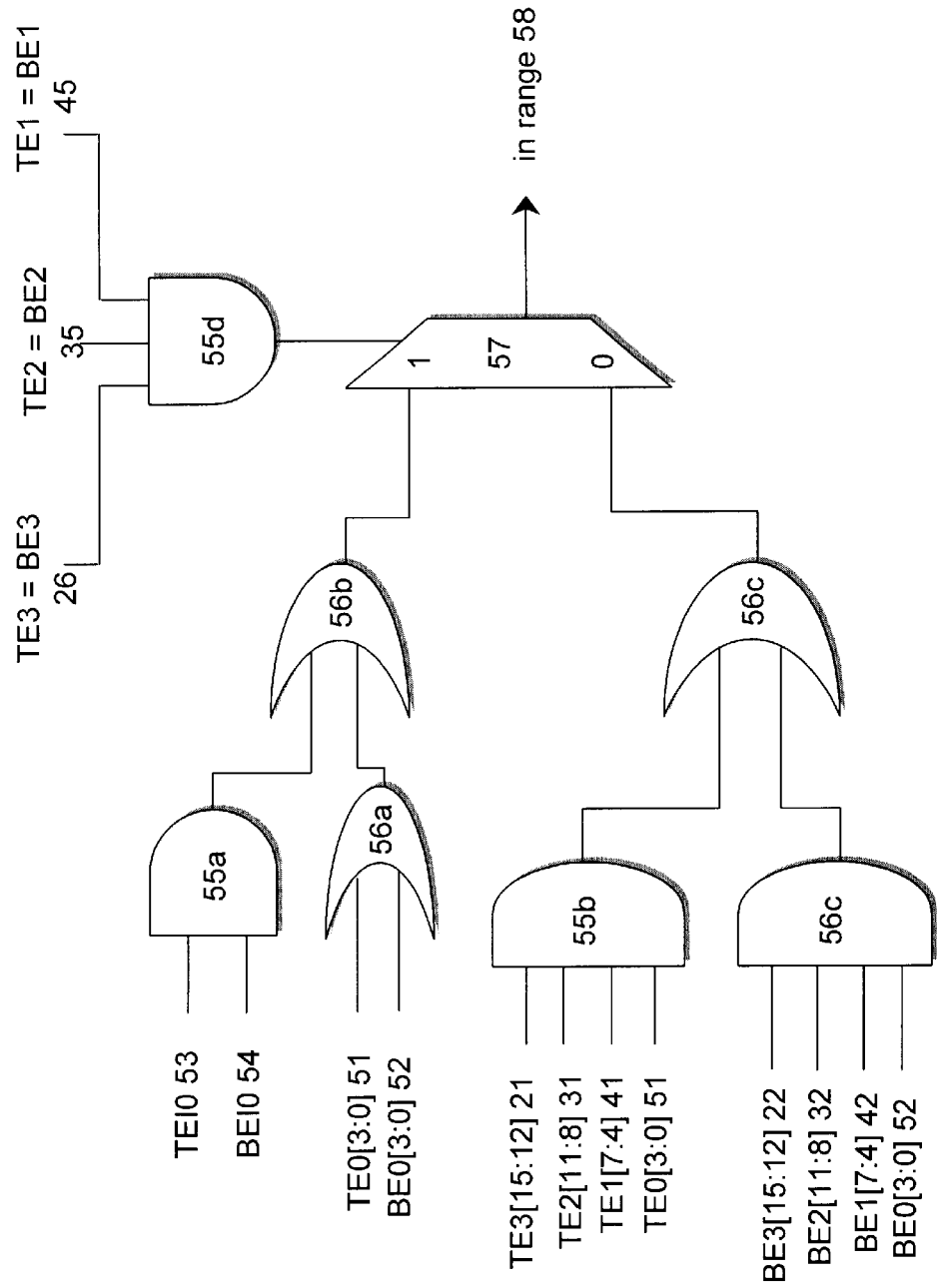
FIG. 5 is a gate-level diagram illustrating a bottom four-bit circuitry in the range matching circuit in accordance with the present invention.

FIG. 5 is a gate-level diagram illustrating the bottom four-bit circuitry 50 in the range matching circuit 10. During the comparison of address bits, IA[3:0] to the edge bits TE[3:0] and BE[3:0], through the bottom four bit circuitry 20, there are seven possible situations that can result:

first, the incoming address matches the top edge address, IA[3:0]=TE3[3:0];

second, the incoming address matches the bottom edge address, IA[3:0]=BE3[3:0];

third, the incoming address is less than the top edge address, IA[3:0]<TE[3:0];

fourth, the incoming address is greater than the bottom edge address, IA[3:0]<TE[3:0];

fifth, the incoming address is less than the top edge address, IA[3:0]<TE[3:0] and is also greater than the bottom edge address, IA[3:0]>BE3[3:0];

sixth, none of the above.

These situations are combined with information from the top four-bit circuitry and the upper middle four-bit circuitry and the lower four bit circuitry to create four scenarios:

First, if IA[15:4]=TE[15:4] but not =BE[15:4], then the incoming address will be within range if IA[3:0]<TE[3:0] or IA[3:0]=TE[3:0].

Second, if IA[15:4]=BE[15:4] but not =TE[15:4], then the incoming address will be within range if IA[3:0]>BE[3:0] or IA[3:0]=BE[3:0].

Third, if IA[15:4]=TE[15:4] and is also =BE[15:4], then the incoming address is within range if TE[3:0]≧IA[3:0] ≧BE[3:0].

Fourth, if none of the above three scenarios are true, then the incoming address is outside the range.

Figure 6:
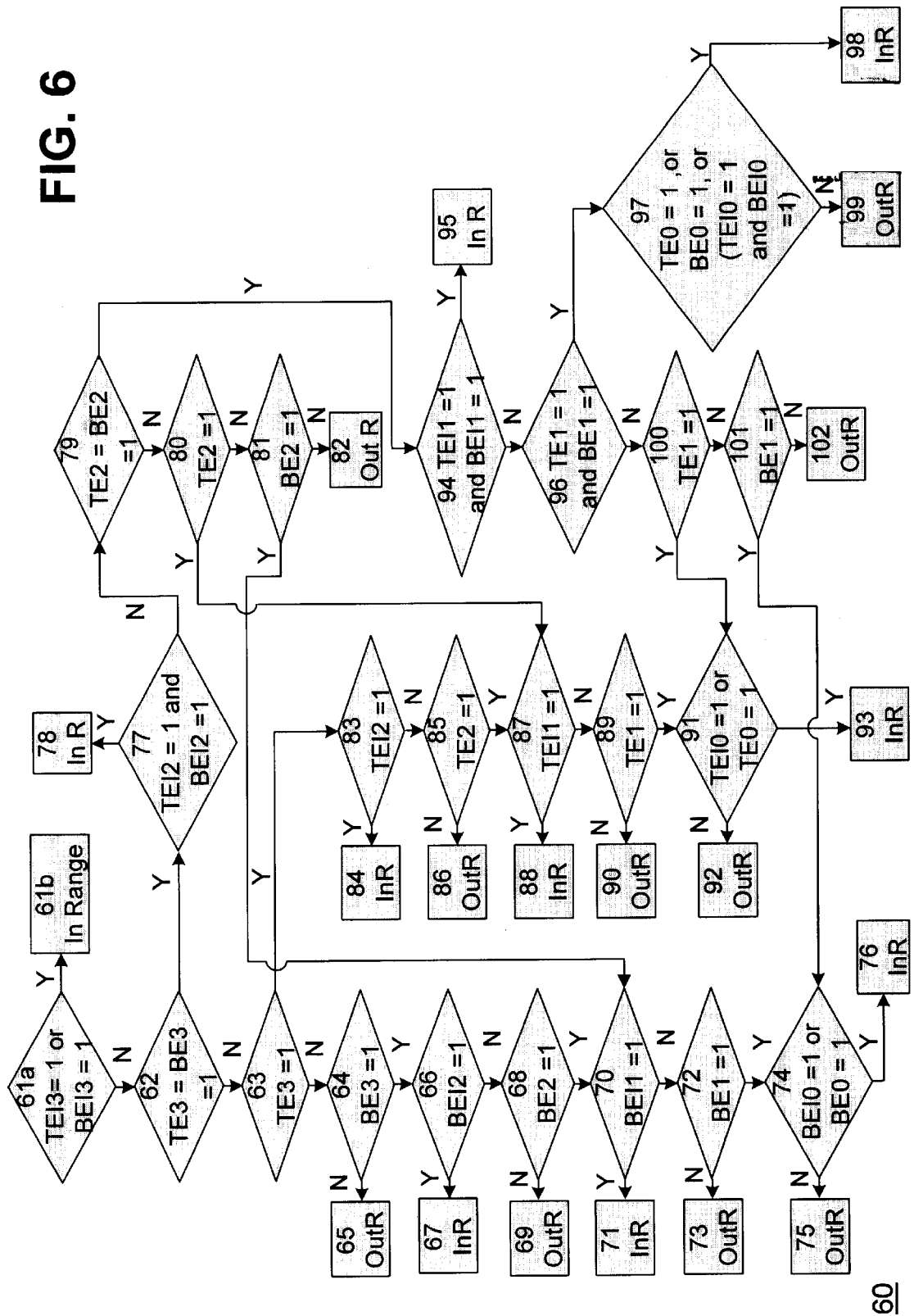
FIG. 6 is flow diagram illustrating a range matching process in accordance with the present invention.

FIG. 6 is flow diagram illustrating a range matching process 60. The nonmenclature used is defined below, although it is apparent to one of ordinary skill in the art that similar or equivalent definitions may be used without departing from the spirits in the present invention.

TE3=1 means that the IA[15:12]=TE[15:12]
TEI3=1 means that the IA[15:12]<TE[15:12]
BE3=1 means that the IA[15:12]=BE[15:12]
BEI3=1 means that the IA[15:12]>BE[15:12]
TE2=1 means that the IA[1:8]=TE[11:8]
TEI2=1 means that the IA[11:8]<TE[11:8]
BE2=1 means that the IA[11:8]=BE[11:8]
BEI2=1 means that the IA[11:8]>BE[11:8]
TE1=1means that the IA[7:4]=TE[7:4]
TEI1=1 means that the IA[7:4]<TE[7:4]
BE1=1 means that the IA[7:4]=BE[7:4]
BEI1=1 means that the IA[7:4]>BE[7:4]
TE0=1 means that the IA[3:0]=TE[3:0]
TEI0=1 means that the IA[3:0]<TE[3:0]
BE0=1 means that the IA[3:0]=BE[3:0]
BEI0=1 means that the IA[3:0]>BE[3:0]

The range matching process 60 determines 61a if the incoming address within the inside top edge and the inside bottom edge of a RAM. If the condition is true, where both TEI3=1 and BEI3=1, an in-range signal is generated 61b.

If the condition is false, where TEI3≠1 or BEI3≠1, then the range matching process 60 determines 62 if the top edge 3 TE3 21 equals to the bottom edge 3 BE3 22 (both TE3 21 and BE3 22 are true). If this condition is false, where TE3 21≠1 or BE3≠1, the range matching process 60 computes 63 if TE3 21=1. If the condition is once again false, where TE3 21≠1, the range matching process 60 determines 64 if BE3 22=1. An out-of-range signal is generated 65 if the condition is false, BE3 22≠1.

However, if the condition at step 64 is true, the range matching process 60 continues to compute 66 into the next segment to determine whether BEI2=1. An in-range signal is generated 67 if the condition is true, where BEI2 34=1. Otherwise, the range matching process 60 computes 68 if BE2 32=1 is true. An out-of range signal is generated 69 if the condition is false, where BE2 32≠1.

However, if the condition at step 68 is true, where BE2 32=1, the range matching process 60 computes 70 continues to compute the range matching into the next segment to determine whether BEI1 44=1. An in-range signal is generated 71 if the condition is true, where BEI1 44=1. Otherwise, the range matching process 60 computes 72 if BE1 42=1 is true. An out-of range signal is generated 73 if the condition is false, where BE1 42≠1. If condition is true, where BE1 42=1, the range matching process 60 continues to compute 74 the next segment to determine if BEI0 54=1, or BE0 52=1. An out-of range signal is generated 75 if the condition is false, where both BEI0 54≠1 and BE0 52≠1. Otherwise, an in-range signal is generated 76 if the condition is true, where if BEI0 54=1 or BE0 52=1.

At step 62, if the result is a true condition, where both TE3 21=1 and BE3 22=1, the range matching process 60 then assesses 77 if TEI2 33=1 and BEI2 34=1. An in-range signal is generated 78 if the condition is true, where both TEI2 33=1 and BEI2 34=1. Otherwise, if the condition is false, where TEI2 33≠1 or BEI2 34≠1, then the range matching process 60 determines 79 if TE2 31=1 and BE2 32=1. If the condition is false, where TE2≠1 or BE2 32≠1, then the range matching process 60 computes 80 if TE2 31=1. If the condition is false, where TE2 31≠1 by itself, then the range matching process 60 computes 81 if BE2 32=1. An out-of range signal is generated 82 if the condition is false, where BE2 32≠1. If the condition is true, where BE2 32=1, the range matching process 60 branches to step 70.

At step 63, if the result is a true condition, where the top edge 3 TE3 21=1, indicating that the incoming address [15:12] 11a matches the upper four bits for the TE[15:12] 21, the range matching process 60 then determines 83 whether TEI2 33=1. An in-range signal is generated 84 if the condition is true, where TEI2 33=1. If the condition if false, where TEI2 33≠1, then the range matching process 60 determines 85 if TE2 31=1, indicating that that there is a match between incoming address [11:8] 12a and TE2[11:8] 31. An out-of-range signal is generated 86 if the condition is false, where TE2 31≠1. If the condition is true, where TE2 31=1, the range matching process 60 determines 87 if TEI1 43=1. An inrange signal is generated 88 if the condition is true. Step 80 also branches to step 87 if TE2 32=1. Otherwise, if the condition is false, where the range matching process 60 determines if TE1 41=1. An out-of-range signal is generated 90 if the condition is false, where TE1 41≠1. Otherwise, if the condition is true, where TE1 41≠1, the range matching process 60 determines 91 if TEI0 53=1, or TE0 51=1. An out-of-range signal is generated 92 if the condition is false, where both TEI0 53≠1 and TE0 51≠1. Conversely, an in-range signal is generated 93 if the condition is true, where TEI0 53=1, or TE0 51=1.

At step 79, if the result is a true statement, then the range matching process 60 continues to determine 94 if both TEI1 43=1 and BEI1 44=1. An in-range signal is generated 95 if the condition is true. If the condition is false, where TEI1 43≠1 or BEI1 44≠1, the range matching process 60 computes 96 if both TE1 41=1 and BE1 42=1. If the condition is true, where TE1 41=BE1 42=1, the range matching process 60 determines 97 if TE0 51=1, or BE0 52=1, or TEI0 53=1 and BEI0 54=1. An in-range signal is generated 98 if the condition is true, where TE0 51=1, or BE0 52=1, or TEI0 53=1 and BEI0 54=1. Conversely, an out-of-range signal is generated 99 if the condition is false, where TE0 51≠1, and BE0 52≠1, and (TEI0 53≠1 or BEI0 54≠1)

At step 96, if the condition is false, where TE1 43≠1 or BE1 44≠1, the range matching process 60 determines 100 if TE1 41=1. The process branches to step 91 if the condition if true, where TE1 41=1. Otherwise, if the condition if false, where TE1 41≠1, then the range matching process 60 determines 101 if BE1 42=1. The process jumps to step 74 if the condition is true, provided that BE1 42=1. An out-of-range signal is generated 102 if the condition is false, where BE1 42≠1.

The patent disclosure includes copyrightable material. The copyright owner gives permission for facsimile reproduction of material in Patent Office files, but reserves all other copyright rights whatsoever.

The above embodiments are only illustrative of the principles of this invention. and are not intended to limit the invention to the particular embodiments described. For example, although the range in this embodiment is formulated in a group of four bits, it is apparent to one ordinary skill in the art that the range can be selected to optimize a particular design, such as in groups of 3-bit segment, 5-bit segment, 6-bit segment, 7-bit segment, or more. Additionally, one of ordinary skill in the art should recognize that this type of range matching can be extended to, for example, 20 bits, 24 bits, 32 bits, 64 bits, 128 bits, or more. Accordingly, various modifications, adaptations, and combinations of various features: of the described embodiments can be practiced without departing from the scope of the invention as set forth in the appended claims.

I claim:

1. A method for range matching, comprising the steps:
   dividing an incoming address IA[7:0] into a first segment IA[7:4] and a second segment IA[3:0]; and
   comparing the first segment IA[7:4] of the incoming address against a first segment TE1[7:4] of a top edge of an address memory space and the first segment of a bottom edge BE1[7:4] of the address memory space.

2. The method of claim 1, further comprising the step of comparing the second segment IA[3:0] of the incoming address against a second segment TE0[3:0] of a top edge of the address memory space and the second segment of a bottom edge BE0[3:0] of the address memory space.

3. The method of claim 2, wherein the comparing of the first and second segments are executed simultaneously.

4. The method of claim 2, wherein the comparing of the first and second segments are executed serially.

5. A system for encoding range matching, an incoming address being divided into a first incoming address segment IA[7:4] and a second incoming address segment IA[3:0], a memory address space having a first n-bit segment and a second n-bit segment, a first RAM for storing multiple sets of encoded values, a second RAM for storing multiple sets of encoded values comprising:
   a first $2^n$ row memory segment containing information of a top edge TE1[7:4] and a bottom edge BE1[7:4] of the first $2^n$ row memory segment; and
   a second $2^n$ row memory segment, coupled to the first memory segment, containing information of a top edge TE1[3:0] and a bottom edge BE1[3:0] of the second $2^n$ row memory segment.

6. The system of claim 5, wherein the information of the first $2^n$ row memory segment comprises a first column which stores a set of values wherein a value of "1" is placed if the first incoming address segment matches the n-bit first segment of the top edge of the memory address space, and wherein a value of "0" is placed if the second incoming address segment does not match the n-bit first segment of the top edge of the memory address space.

7. The system of claim 6, wherein the set of values are encoded with "0" or "1" in the first column in the first RAM.

8. The system of claim 5, wherein the information of the first $2^n$ row memory segment comprises a second column which stores a set of values wherein a value of "1" is placed if the first incoming address segment matches the n-bit first segment of the bottom edge of the memory address space, and wherein a value of "0" is placed if the second incoming address segment does not match the n-bit first segment of the bottom edge of the memory address space.

9. The system of claim 8, wherein the set of values are encoded with "0" or "1" in the second column in the first RAM.

10. The system of claim 5, wherein the information of the first $2^n$ row memory segment comprises a third column which stores a set of values wherein a value of "1" is placed if the first incoming address segment is less than the n-bit first segment of the top edge of the memory address space, and wherein a value of "0" is placed if the second incoming address segment is equal to or greater than the n-bit first segment of the top edge of the memory address space.

11. The system of claim 10, wherein the set of values are encoded with "0" or "1" in the third column in the first RAM.

12. The system of claim 5, wherein the information of the first $2^n$ row memory segment comprises a fourth column which stores a set of values wherein a value of "1" is placed if the first incoming address segment is greater than the n-bit first segment of the top edge of the memory address space, and wherein a value of "0" is placed if the second incoming address segment is equal to or less than the n-bit first segment of the top edge of the memory address space.

13. The system of claim 12, wherein the set of values are encoded with "0" or "1" in the fourth column in the first RAM.

14. The system of claim 5, wherein the information of the second $2^n$ row memory segment comprises a first column which stores a set of values wherein a value of "1" is placed if the first incoming address segment matches the n-bit second segment of the top edge of the memory address space, and wherein a value of "0" is placed if the second incoming address segment does not match the n-bit second segment of the top edge of the memory address space.

15. The system of claim 14, wherein the set of values are encoded with "0" or "1" in the first column in the second RAM.

16. The system of claim 5, wherein the information of the second $2^n$ row memory segment comprises a second column which stores a set of values wherein a value of "1" is placed if the first incoming address segment matches the n-bit second segment of the bottom edge of the memory address space, and wherein a value of "0" is placed if the second incoming address segment does not match the n-bit second segment of the bottom edge of the memory address space.

17. The system of claim 16, wherein the set of values are encoded with "0" or "1" in the second column in the second RAM.

18. The system of claim 5, wherein the information of the second $2^n$ row memory segment comprises a third column which stores a set of values wherein a value of "1" is placed if the first incoming address segment is less than the n-bit second segment of the top edge of the memory address space, and wherein a value of "0" is placed if the second incoming address segment is equal to or greater than the n-bit first segment of the top edge of the memory address space.

19. The system of claim 18, wherein the set of values are encoded with "0" or "1" in the third column in the second RAM.

20. The system of claim 5, wherein the information of the second $2^n$ row memory segment comprises a fourth column which stores a set of values wherein a value of "1" is placed if the first incoming address segment is greater than the n-bit second segment of the top edge of the memory address space, and wherein a value of "0" is placed if the second incoming address segment is equal to or less than the n-bit first segment of the top edge of the memory address space.

21. The system of claim 20, wherein the set of values are encoded with "0" or "1" in the fourth column in the second RAM.

22. A method for range matching in a plurality of memory address spaces, the plurality of memory address spaces having a first memory address space and a second memory space, an incoming address being divided into a first segment and a second segment comprising the steps of:

receiving a first segment of the incoming address in a first memory address space;

determining whether the first segment of the incoming address is less than a first segment of a top edge of the first memory address space and greater than a first segment of a bottom edge of the first memory address space; and if the first segment of the incoming address matches the first segment of the top edge of the first memory address space but does not match the first segment of the bottom edge of the first memory address space, then wherein the determining step further comprises determining if a second segment of the incoming address is less than or equal to a second segment of the top edge of the first memory address space.

23. A method for range matching in a plurality of memory address spaces, the plurality of memory address spaces having a first memory address space and a second memory space, an incoming address being divided into a first segment and a second segment, comprising the steps of:

receiving a first segment of the incoming address in a first memory address space;

determining whether the first segment of the incoming address is less than a first segment of a top edge of the first memory address space and greater than a first segment of a bottom edge of the first memory address space; and if the first segment of the incoming address matches the first segment of the bottom edge of the first memory address space but does not match the first segment of the top edge of the first memory address space, then wherein the determining step further comprises determining if a second segment of the incoming address is greater than or equal to a second segment of the bottom edge of the first memory address space.

24. A method for range matching in a plurality of memory address spaces, the plurality of memory address spaces having a first memory address space and a second memory space, an incoming address being divided into a first segment and a second segment, comprising the steps of:

receiving a first segment of the incoming address in a first memory address space; and determining whether the first segment of the incoming address is less than a first segment of a top edge of the first memory address space and greater than a first segment of a bottom edge of the first memory address space;

wherein in the determining step, if the first segment of the incoming address matches the first segment of the top edge of the first memory address space and if the first segment of the incoming address matches the first segment of the bottom edge of the first memory address space, further comprising the step of determining whether the second segment of the incoming address is both less than or equal to a second segment of a top edge of the first memory address space and is greater than or equal to a second segment of a bottom edge of the first memory address space.

* * * * *